ADDISON Y. GUNTER
THOMAS E. OWEN
INVENTORS.

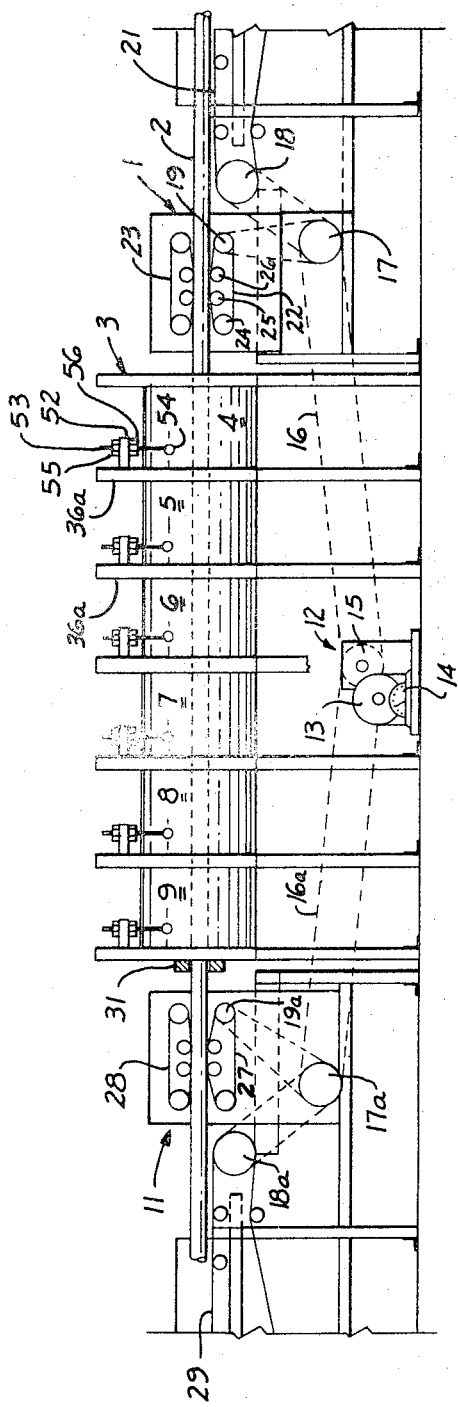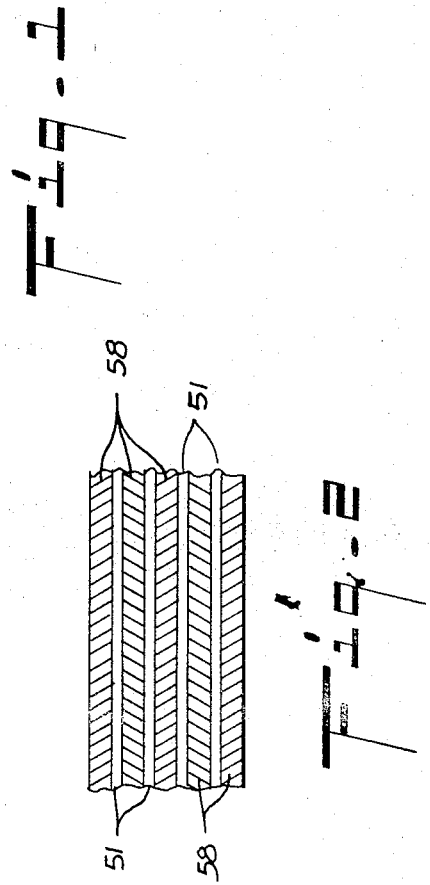
ADDISON Y. GUNTER
THOMAS E. OWEN
INVENTORS

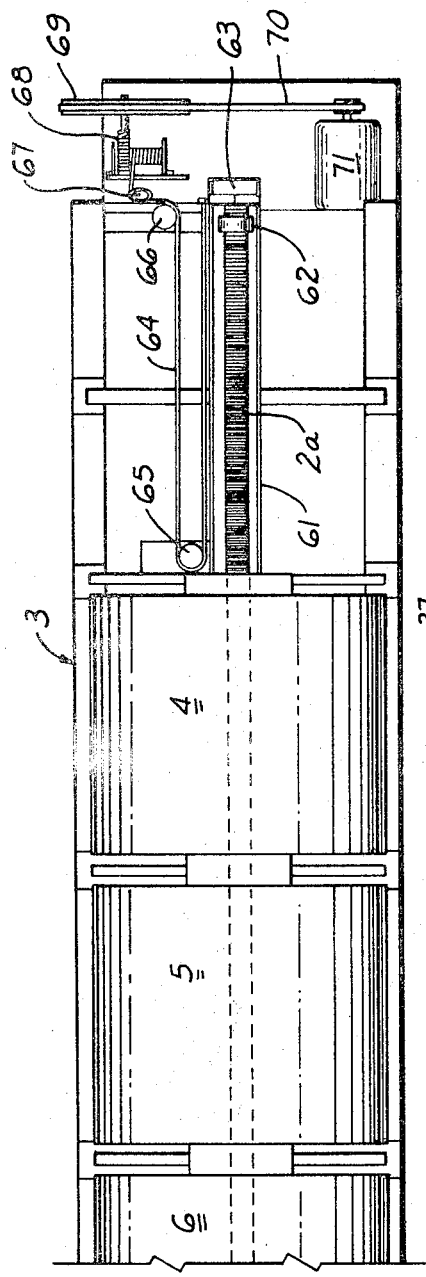
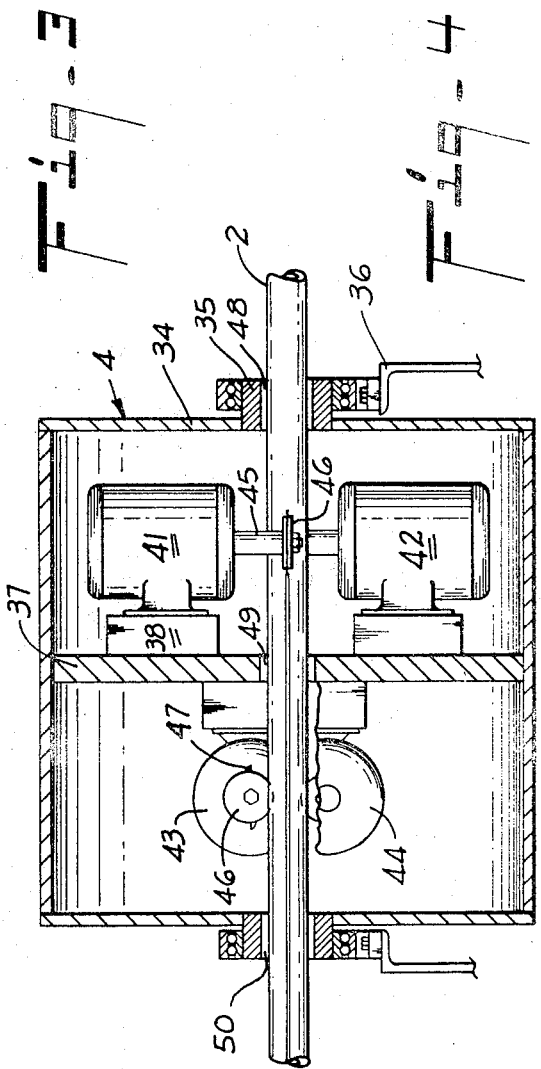

BY

ATTORNEYS

United States Patent Office 3,520,169
Patented July 14, 1970

3,520,169
MACHINE FOR MANUFACTURING SLITTED FINNED TUBING FOR USE IN HEAT EXCHANGERS
Addison Y. Gunter and Thomas E. Owen, both of P.O. Box 36100, Houston, Tex. 77036
Original application Oct. 20, 1964, Ser. No. 405,143. Divided and this application Aug. 25, 1967, Ser. No. 663,309
Int. Cl. B21d 43/28
U.S. Cl. 72—324       11 Claims

ABSTRACT OF THE DISCLOSURE

A machine for manufacturing slitted finned tubing comprises a saw assembly made up of a plurality of rotary saws arranged in a circular pattern, and a means for passing finned tubing axially through the assembly at a selected linear speed. The saws are disposed in laterally spaced apart planes which are parallel to the axis of the tubing and are rotated at a selected speed. Means are provided for adjusting at least one of the saw speed and linear speed of the tubing to maintain a ratio between.

---

This application is a division of our copending application, Ser. No. 405,143, filed Oct. 20, 1964, now Pat. No. 3,355,788 and entitled "Improved Finned Tubing for Heat Exchangers, Process and Apparatus and for The Production Thereof."

This invention relates to the manufacture of finned tubing for heat exchange use, and includes an improved machine for the production thereof.

It has long been customary to attach fins made of metal having a high coefficient of heat transfer to the exterior of tubing used in heat exchanger bundles and the like to increase the effective area for heat exchange between a fluid flowing through the interior of the tubing and another fluid flowing across the outside thereof. Such fins have been formed on heat exchange tubing as separate discrete cross fins, or as a single continuous strip of metal on the tube in helical configuration and attached by various means. Fins have been held by embedding in a groove in the exterior of the tubing, attached by welding or soldering, brazing, or flanged at the point of contact of the fin and tubing and held firmly on the tubing by tension applied in winding or extruding the fin.

It is well known that slots or openings in the fins greatly increase the efficiency of heat transfer, especially when the fluid flowing across the outside of the tubing is a gas. This increase in efficiency is regarded as due to increased turbulence and reduction of laminar film of fluid in contact with the fin. Louvered type openings designed to increase turbulence are shown and described by Buschow in U.S. Pat. No. 2,643,863 and fins having slots in their peripheries are shown by Rodeck in U.S. Pat. No. 2,372,795.

It is also known that a fin of definite thickness conducts heat substantially in proportion to its surface area, so that formation of openings and slits in such fins reduces the rate of flow of heat through the fins, although the improvement in heat transfer resulting from turbulence and reduction in laminar film structure of a fluid flowing across the fins is great enough that it outweighs the losses due to decreased surface area of the fins.

Attempts to saw slits in helical and discrete fins on heat exchange tubing have been made, but these have been unsuccessful due to two principal disadvantages. First, the fins are so flexible that impact of saw teeth flatten the fins along the central tube beyond the limit of elasticity of the fins so that they do not recover their position substantially vertical to the longitudinal axis of the tube, second, saw teeth do not bite into the fins properly, so that slits when formed by saws are worn into the fins rather than cleanly cut and as a result the slits have many long hair-like threads of metal, or "whiskers," adhering in the slits which greatly increase pressure drop in a heat exchanger provided with such finned tubing, and third, saws, although made of very hard steel wear out so quickly, even when fins of soft aluminum are cut, as to make the process impractical. As a result it has been believed that fins must be supported in a matrix of wax, or the like, if they are to be slit by sawing, and no one, to our knowledge, has been able to saw clean radial slits in such fins without production of excessive numbers of adhering threads of metal, or flattening the fins excessively.

It is an object of the present invention to provide a machine for sawing slits in fins of finned tubing which does not flatten such fins excessively.

Another object is to provide a machine for sawing substantially radial slits in fins on finned tubing and twisting fin sections between the resulting slits into louvered or herringbone configuration.

Another object is to provide a machine for sawing slits in fins of finned tubing in which production of excessive numbers of threads or whiskers of metal adhering to the fins adjacent to the slits is prevented.

Another object is to provide a machine for sawing slits in fins of finned tubing in which maximum surface area of the fins is retained.

Another object is to provide an improved machine for sawing slits in fins on finned tubing in which saw teeth wear well.

Another object is to provide a machine of the above type in which linear speed of finned tubing and saw tooth cut per impact may be correlated to cut clean slits in fins supported only by the tubing.

Still another object is to provide a machine for sawing slits in fins on finned tubing at high rates of speed and at low labor costs.

Another object is to provide a machine for manufacturing finned tubing for heat exchanger use in which fins on the tubing have approximately radial slits with substantially parallel sides extending from the periphery of the fins toward the tubing.

Another object is to provide a machine for manufacturing such finned tubing having sections of fins defined by adjacent slits twisted into louvered or herringbone configuration.

Another object is to provide a machine for manufacturing improved finned tubing for heat exchanger use which results in a large increase in heat transfer rate.

Another object is to provide a machine for manufacturing improved finned tubing for heat exchanger use which does not cause excessive pressure drop in a heat exchanger equipped with such tubes.

Other objects and advantages will become apparent from consideration of the description given below and the attached drawings.

In the illustrated use of the machine of the present invention, finned tubing having fins extending outward of the exterior of the tubing and supported only by the tubing is passed in axial direction through an assembly of saws; and slits extending approximately radially from the periphery of the fins toward the tubing are sawed into the fins. The slits may be at an angle of as much as 20° from the radius if desired. The term "fins" is used in this specification and claims to include consecutive turns of helical fins, or discrete fins, applied and attached to the tubing in any manner, since the process applies equally to fins of any cross-fin type. Preferably the number of saws in the assembly is equal to the number of radial slits desired in a finished fin and the saws are arranged at equal angular distances from each other around the circumference of the tubing, but the number of saws may be a fraction of the desired number of slits and the tubing may be passed through the saw assembly, turned through suitable circumferential arc, and passed through the saw assembly again until a series of slits of desired number and spacing in the circumference of the fins is obtained.

The saws are preferably of flat circular type, having widely spaced teeth on the blades. While other types of saw, as for example, band saws, can be used, these are more expensive than simple circular saws and are inconvenient to arrange in a saw assembly of reasonable length, so that the circular saws are much to be preferred.

The linear rate of travel of the finned tubing through the saw assembly and speed of the saws are controlled so that each saw tooth cuts small chips of metal cleanly from the fin without production of an excessive number of threads or "whiskers" of metal adhering to the fins at the edges of the slits. We have found that control of the ratio of linear speed of the finned tube through the sawing zone to the speed of the saws within certain limits results in avoiding production of such threads or whiskers of metal, prevents excessive wear on saw teeth, and prevents deformation and flattening the fins to an undesirable extent.

During or after the sawing operation, the sections of fins bordering each slit are twisted so that these sections of fins converge, with the sections bordering alternate slits converging toward the leading and trailing ends of the finned tubing, thus giving the fin a herringbone configuration. The slits are sawed into the fins to a depth of about 0.3 to 0.7 of the total height of the fin. We have found that the new type of fin resulting from these slitting and twisting operations results in an overall increase in heat transfer rate of some 25% to 50% as compared to tubing of the same size equipped with plain fins of the same diameter when assembled in otherwise identical heat exchanger bundles. This increase in rate of heat transfer is due in part to saving in fin area but the principal factor is the improved degree of turbulence and reduction of laminar film obtained in a heat exchanger containing tubing of this type, without excessive pressure drop.

The machine of our invention includes the above-described saw assembly in which a plurality of the circular saws having widely spaced teeth are arranged in planes defined by radii and the longitudinal axis of finned tubing to be passed through the assembly. The saws are located in these planes so that each tooth of each saw contacts a plurality of fins on the finned tubing successively during a single revolution of a saw blade. Means are provided for driving all saws at selected speeds which may be different for saws cutting uphill and downhill if desired and feed means for finned tubing is arranged to pass finned tubing through the saw assembly at a selected linear speed. Preferably the feed means also provides continuous orientation of the tubing with respect to the saw blades so that the tubing does not rotate on its axis as it passes through the saws, although the tubing may rotate a few degrees in passing through the saw assembly without loss of advantages.

Means for adjustably selecting either the saw speed or linear speed of the tubing or both is provided, so that a selected ratio of saw speed to linear speed of tubing may be maintained. It is not necessary that all saws run at the same speed. So long as the ratios of saw speed to tubing speed provide a saw tooth bite or cut per impact within the maximum and minimum values described below, any or all the saws may be operated at any speed desired. The means for driving the saw blades may be arranged so that the saw blades of alternate saws rotate in opposite directions. When the drive is arranged in this manner it is usually not necessary to have an additional means for bending the sections of fin left between adjacent slits since the opposite direction of the drive ordinarily will twist these sections, so that sections of fin bordering each slot will converge in the direction that the saw was turning. When the fins are of such type that sufficient bending by saw action is not obtained, a means for twisting the fin sections into herringbone configuration is required.

Alternatively, when all saws are driven in the same direction a means for twisting the sections left between adjacent slits into such converging or herringbone pattern is provided. This means preferably is a ring having inward projecting fingers or pins disposed to enter alternate slits in the periphery of the fins, and contact the fin sections on at least one side of the corresponding slit so as to twist these sections into positions converging toward the trailing end of the finned tubing. This ring is preferably located at the exit of the saw assembly.

It will be seen that fins arranged in this manner causing fin sections at opposite sides of every other slot around the circumference of the finned tubing to converge toward the trailing end of the tubing will result in causing the sections of the fins bordering the slots which receive no pins, to converge toward the leading end of the finned tubing so that the herringbone pattern of fin is obtained. It is believed that the apparatus and process may perhaps be best understood by consideration of the following detailed description and the drawings wherein:

FIG. 1 is a schematic elevation of one preferred type of the machine of the present invention showing diagrammatically a saw assembly with cooperable feed and withdrawal apparatus for finned tubing;

FIG. 2 is an enlarged view of the completed finned tubing manufactured with the device of FIG. 1;

FIG. 3 is a plan view of a modification of the device of FIG. 1 illustrating alternative feed means;

FIG. 4 is a vertical section through one unit of the saw assembly illustrating one preferred arrangement of saws therein;

Figures 6, 7:
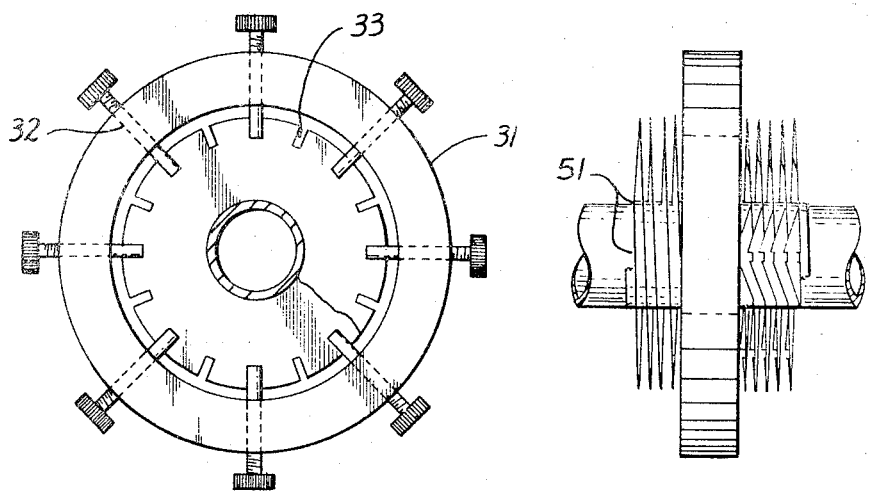
FIG. 6 illustrates one means for twisting fin sections between slits to converge alternately toward leading and trailing ends of the finned tubing.
FIG 7 illustrates finned tubing emerging from the device of FIG. 6 with the fins twisted into herringbone configuration.

In the device shown in FIG. 1, the reference numeral 1 designates generally a feed section of the machine by which a length of finned tubing 2 is passed into a saw assembly designated generally as 3. The assembly 3 is made up of a plurality of units illustrated as units 4, 5, 6, 7, 8 and 9 whose construction is illustrated in greater detail in FIG. 4. A receiving section designated generally as 11 is disposed at the end of the saw assembly opposite to feed section 1.

In the particular device illustrated, both the feed and withdrawal apparatus are driven by a single unitary drive system designated generally as 12. This drive section includes a motor 13 arranged to be driven at a selected constant speed controlled by any suitable speed control device illustrated as a rheostat 14. Motor 13 is arranged to drive a master pulley 15 either directly or through a suitable train of gearing or other drive means (not shown). Master pulley 12 through suitable drive means illustrated as belts 16 and 16a is arranged to drive pulleys 17 and 17a in the feed and withdrawal sections of the machine respectively at the same speed. The pulley 18 is disposed to drive a conveyor 21 illustrated as of belt type, which may be as long as required to carry a length of finned tubing in axial direction toward the saw assembly 3.

The feed section of the machine includes means providing continuous orientation of the tubing with respect to the saw blades illustrated as a pair of opposed belts 22 and 23 located at such distance from each other as to impose a light pressure upon the periphery of fins on tubing 2. This pressure is insufficient to bend the fins but is great enough to prevent the tube from rotating around its axis to any substantial extent while passing through the saw section. Belt 22 is carried on driven roller 19 and idler rollers 24, 25 and 26. Belt 23 may be carried entirely upon idler rollers as illustrated, arranged to give the belt the same general mirror-image conformation as belt 23.

Belts 27 and 28 in the withdrawal section of the machine, are similar in construction to belts 22 and 23 and serve to prevent rotation of the tube about its longitudinal axis after the trailing end of the tube passes through belts 22 and 23. Driven pulley 18a in the withdrawal section drives a conveyor 29 to carry the tubing to a suitable location for storage for further processing or use after passing through the machine.

A means for twisting sections of the fins defined by adjacent slots is illustrated at 31. This means preferably is a ring 31 having fingers or pins 32 arranged to contact at least one side of the slit, and disposed to enter every other slit in the periphery of the fins as the tubing passes through the ring. These pins preferably have a diameter greater than the width of the slits and cause adjacent sections of the fin on opposite sides of each slit into which a pin 32 enters to be twisted so that the edges of these sections of fin converge in a direction toward the trailing end of the tubing. Pins of lesser width which contact a fin section on only one side of the slit may be used if desired. This twisting effect causes the edges of the fin sections at the slits between pins to be twisted in opposite direction so that the fin sections along these slits converge in the direction of the leading end of the tubing, thus giving the fins a herringbone configuration illustrated in FIG. 2.

One preferred arrangement of saws in each unit of the saw assembly is illustrated in FIG. 4. The entire unit designated generally as 4 includes a housing 34 preferably of cylindrical construction to save machine space, but which may have any outer shape desired, mounted on a means 35 for rotation through an arc, and carried on a support 36.

A plurality of saws, illustrated as four saws, arranged in opposed pairs are carried on suitable bases 28 supported by a heavy center wall 37. Motors 41, 42, 43 and 44 each have a shaft 45 carrying a circular saw blade 46 having teeth 47 widely spaced from each other, and illustrated as 180° apart.

Figure 5:
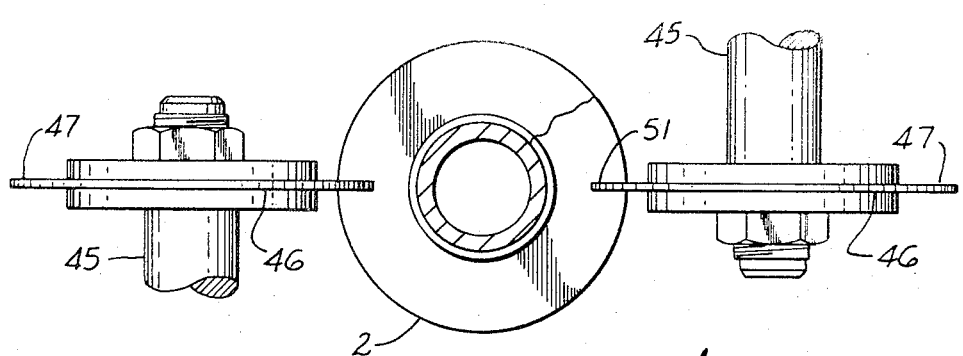
FIG. 5 is a detailed illustrating the arrangement of one pair of saws in the unit of FIG. 4.

The arrangement of saws in opposed pairs is best shown in FIG. 5. A series of aligned openings 48, 49 and 50 extend through the end wall of housing 34 and the heavy center wall 37 so that finned tubing may be introduced through the openings in position for the fins to be cut by the saw blades.

In each unit the saws are illustrated as arranged in alternate pairs cutting at a right angle to each other. The blades of consecutive pairs are set to saw splits 51 at 90° from each other. A means for adjusting the arcuate position of the saws of each unit to a fixed point on the circumference of the tubing is shown only in FIG. 1. As illustrated, this means comprises an arm 52, an adjustment screw 53 pivotally attached to housing 34 at 54 and nuts 55 and 56 for holding the housing in a desired position. FIG. 1 shows six consecutive units of saws although any number desired may be used. We have found that six units of four saws each cutting 24 slits at an angular distance of 15° from each other are preferred when one inch tubing having ⅝ inch fins thereon is to be processed, since a greater number of slits results in fin sections 58, limited by the slits, which are so easily bent that they are difficult to handle in assembling heat exchanger bundles without bending or battering the fins. Theoretically the greater the number of fin sections 58 the more efficient the fin should be, but the above figure represents a compromise between greatest efficiency and structural strength.

Figure 8:
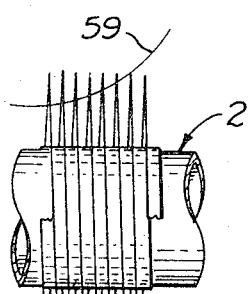
FIG. 8 illustrates one preferred type of finned tubing suitable for feed into the machine illustrated in the remaining drawings.

Each saw in each unit of the saw assembly is centered at a distance from the tubing and has such diameter that each tooth on the saw blade contacts a plurality of fins, preferably from six to nine fins in a single revolution of the saw blade. This type of contact is best illustrated in FIG. 8 wherein the arc 59 illustrates the path of travel of a saw tooth. It will be seen that when a saw located in this manner rotates in clockwise manner that the tooth will approach tube 2 as it passes through the arc 59 and conversely when the saw rotates in counterclockwise manner, the tooth will move further away from tube 2 in arc 59 as succeeding fins are contacted by the tooth. For the purpose of this specification and claims, cutting with a saw tooth approaching the tube will be referred to as "downhill" sawing and cutting with a saw tooth moving in arc 59 further and further away from tube 2, will be called "uphill" sawing.

The modified drive arrangement shown in FIG. 3 includes a V-shape trough 61 adapted to guide finned tubing 2a into unit 4 of the saw assembly 3. A tool tube holder 62 having an opening suitable to receive an end of tubing 2a is mounted for reciprocating movement in trough 61. This holder 62 fits the trough 61 so that the tubing cannot rotate about its longitudinal axis as it is moved into the saw assembly. The tube holder is attached to the sliding block 63 which is drawn toward the saw assembly 3 by a flexible cord or cable 64 attached thereto and passing around pulleys 65, 66 and 67 to a drum driven through a worm and gear assembly 68, pulley 69, belt 70 and a variable speed motor 71. This device is equally effective with that shown in FIG. 1 but is not quite so convenient in operation since it requires attachment of the end of the tube to the holding device 62 and detachment therefrom when the holder 62 reaches its extreme limit of travel.

In operation, tubing having continuous fins thereon is placed upon the feed means and is passed in axial direction through the saw assembly while the ratio of linear speed of the finned tubing to saw speed is controlled within certain limits to prevent excessive wear on the saw blades, flattening of the fins, and production of the sufficient number of adhering threads of metal to the fins at the edges of the slits cut to cause objectional pressure drop across a heat exchanger fitted with such tubing.

We have found that the basic factors determining satisfactory ratios of linear speed of the finned tubing to saw speed are the stiffness of the fins and saw blade impact force. Stiffness of the fins is a complex function of fin height, fin thickness, type of attachment of fins to the tube, metallurgy of the fins and the depth of the radial slits to be cut into the fins. However, once the type, metallurgy and dimensions of the fins to be used and the depth of the cut are selected, the stiffness of the fins becomes a constant quantity and it need be considered only when a change is to be made to fins of different type.

Saw blade impact force is dependent on the thickness and speed of the saw and the depth of sawtooth bite or cut per impact in inches.

These relationships may be determined by the following equation:

(1) $$M = \frac{A \times B \times C}{X \times Y \times Z}$$

wherein M is the average saw tooth bite or cut per impact, A is the linear speed of the finned tubing in inches per minute, B is the number of fins per inch on the finned tubing, C is the total depth of the slit to be cut in inches, X is the revolutions per minute of a circular saw, Y is the number of saw teeth on the blade, and Z is the number of fins contacted per tooth in a single revolution of the blade.

We have determined experimentally that the maximum value for M in the above equation which can be used without excessive wear of saw blades, without excessive flattening of the fins, and without production of an excessive number of threads of metal adhering to the fins at edges of the slits is about 0.02 inch for one of the most widely used types of commercial finned heat exchanger tubing. This tubing has an external diameter of one inch and has eight helical turns of extruded aluminum fin per linear inch, each fin having a height of ⅝ inch and a thickness of 0.016 inch. In determining this value adjacent saws in the assembly were driven at the same rate of speed and in opposite directions, for a reason more fully explained below. The saws used had a thickness of 1/32 inch and had eight teeth located 45° apart on the circumference of the blade; and were arranged so that each tooth contacted seven fins successively in one revolution of the saw. Radial slits were cut into all fins to a depth of ¼ inch.

Fins of other types and sizes will, of course, require a somewhat different maximum value for M. For example, a fin of the same type ½ inch high is somewhat stiffer than the ⅝ inch fin and the tooth bite or cut per impact may be increased to a value of 10 to 15 percent above the value for a ⅝ inch fin. Conversely, a ¾ inch high fin is not so stiff as the ⅝ inch fin and the maximum tooth bite or cut per impact is correspondingly less.

It may be stated as a broad generality that the ratio of stiffness of any thin fin to the stiffness of a ⅝ inch aluminum fin 0.016 inch thick of the type just described multiplied by the maximum or minimum value given for M in the above Equation 1 will give a range of values for M effective to result in clean slits without an excessive number of long thin threads or strips or metal adhering to the fins adjacent the slits, and without excessive flattening of the fins.

Mathematically stated this becomes:

(2) $$Sf M / SAl$$

wherein $Sf$ is the stiffness of any thin fin and $SAl$ is the stiffness of the ⅝ inch aluminum fins described above. A simple calculation thus will give an approximate value of maximum and minimum average saw tooth bite or cut per impact in Equation 1 to be used for any type fin. This equation is, of course, only an approximation. Some adjustment of tubing speed or saw speed may have to be made for best results, but by use of this equation, one skilled in the art can quickly and easily select a ratio of tubing speed to saw speed which results in clean slits in other types of fins.

In cutting such fins we have used saws having 2, 4 or 8 teeth on 3.75 inch diameter saw blades running at speeds from 860 to 1800 revolutions per minute with the finned tubing fed through the saw assembly at a linear speed in the range from 8 to 32 feet per minute, with good results in all cases where the value of M in the above equation was within certain maximum and minimum values. We prefer to cut slits of the narrowest possible breadth to avoid fin area loss. The thinnest saw blade possible is preferred both for this reason and to permit the greatest possible tooth bite or cut per impact in sawing the slits. Saws having a thickness in the range from 1/64 inch to ⅛ inch are preferred with best results, to date, being obtained by the use of saws having a thickness of 1/32 inch. While the 1/64 inch thickness is best from both the standpoint of tooth bite and fin area loss, such thin saw blades are sufficiently flexible that they present problems in cutting the stiffer fins.

The diameter of the saw blade will affect the number of fins contacted by each saw tooth in a single revolution. We have found that 3½ to 4 inch diameter blades arranged to impact seven consecutive fins per revolution were best adapted to sufficiently compact arrangement as to avoid wasting machine space.

It will be seen that teeth on the saw blade will make contact with the fins while moving in an arcuate direction away from the central tubing, or while moving toward the tubing in the arc of impact, depending upon the direction in which the saws are driven, described above as "uphill" and "downhill" cutting. The maximum for M in the above equation is the same whether uphill or downhill type sawing is used, or when alternate saws run in opposite directions thus alternately sawing uphill and downhill.

The minimum value for M in the above Equation 1 however, differs for uphill and downhill cutting. The minimum average tooth bite or cut per impact is about 0.006 inch for downhill cutting using the ⅝ inch fins described above and is about 0.003 inch for uphill cutting.

When the preferred operation, in which saws cutting adjacent slits are driven at the same speed but in opposite directions, is used, the maximum value of M will be 0.02 inch for the ⅝ inch fins and the minimum value will be about 0.006, since both uphill and downhill cutting will be used. In starting up, a ratio of saw speed to linear speed to the finned tubing is selected so that the value of M is between the maximum and minimum values permissible. Either the saw speed, tubing speed or both may then be adjusted to give the maximum rate of production without excessive flattening of the fins, without an excessive number of adhering threads of metal and without a high degree of saw wear.

It will be seen that once the thickness of the saw, number of teeth on the saw blades, dimension and spacing of the fins on the tubing, the diameter of the saw and the depth of the slit have been selected the above equation becomes:

(3) $$M = \frac{A \times k_1}{X \times k_2}$$

and a simple adjustment of saw speed to linear speed of the tubing is all that is required to give the improved results. The unsupported fins are cut cleanly, producing slits having substantially parallel sides extending from the periphery of the fins toward the tubing to a desired depth, thus leaving a greater area of fin than is present if the fin stock should be slitted along one edge prior to winding it on the tubing. The latter type of operation inherently will give a triangular slot rather than a slit having substantially parallel sides. Twisting the fin section defined by two adjacent slits so that these sections alternately converge toward the leading and trailing ends of the tubing results in finned tubing which has an unusually high rate of heat transfer.

The critical factor in determining when flattening of fin sections and/or number of threads of metal adhering to the fins at edges of the slits becomes excessive is the ratio of percent increase in heat transfer rate to percent increase in pressure drop in fluid flowing across the outside of the tubing when the improved finned tubing of the present invention is substituted in a heat exchanger for tubing of the same size and equipped with plain fins of the same diameter. Either flattening the fin sections from a position substantially perpendicular to the tubing, or the presence of threads of metal, or both, will increase the resistance to flow of fluid over the tubing and result in increased pressure drop in the heat exchanger.

It is preferred that the value of the ratio:

$$\frac{\Delta \text{ percent } Ht}{\Delta \text{ percent } P}$$

in which $\Delta$ percent $Ht$ is the percent increase in heat transfer rate and $\Delta$ percent P is the percent increase in pressure drop have a value of 2:1 or more, that is for example, if the heat transfer rate be increased by 50%, the pressure drop should not increase more than about 25%. However, under some circumstances greater increases in pressure drop can be tolerated but the minimum value of the ratio should not be less than 0.5:1. Therefore, the terms "excessive" and "excessively" are used in this specification and claims in a special limited sense in connection with the terms "flattten" and "flattening" fin sections, and "number of adhering threads of metal" and similar expressions to mean a quantity in excess of that required to reduce the value of the above ratio to 0.5:1. The heat transfer rate in the above ratio is calculated in conventional manner as the number of B.t.u. transferred per hour per square foot of heat transfer area per degree Fahrenheit in temperature difference. The pressure drop is stated in pounds per square inch.

By selecting a ratio of linear speed of finned tubing to saw speed to give the above stated maximum and minimum values for M in Equation 2 above, modified by application of Equation 2, if necessary, it is usually possible to produce the slit herringbone fins with so little flattening and so few adhering threads of metal that the percent increase in heat transfer rate to percent increase in pressure drop ratio is within the preferred values of 2:1 or more. With some fins and at very high production rates somewhat more flattening of fin sections and an increased number of adhering threads of metal may result but the process is operable until the minimum value of 0.5:1 for the above ratio is reached.

From the foregoing, it will be seen that this invention is one well adapted to attain all of the ends and objects hereinabove set forth, together with other advantages which are obvious and which are inherent to the machine and process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A machine for manufacturing slitted finned tubing for use in heat exchangers comprising, in combination, a saw assembly, means for passing finned tubing axially through said saw assembly at a selected linear speed, said saw assembly including a plurality of rotary saws having spaced teeth thereon and arranged circumferentially about said finned tubing in angularly spaced apart planes generally parallel to the longitudinal axis of the finned tubing to be passed through the assembly, so that the teeth thereon are disposed in the path of the outer peripheries of said fins whereby a plurality of circumferentially spaced, inwardly extending slits are cut in said outer peripheries of said fins, means for rotating the saws at selected speeds, and means for adjusting at least the saw speed or the linear speed of the tubing to maintain a selected ratio of saw speed to linear speed of said tubing.

2. A machine of the character defined in claim 1, wherein said means for passing the tubing through the assembly is disposed only at opposite ends thereof and includes means for maintaining the tubing against rotation.

3. A machine of the character defined in claim 2, wherein said means for passing the tubing through the assembly includes continuous belts for simultaneously engaging opposite sides of the tubing at the feed and withdrawal ends of the saw assembly.

4. A machine of the character defined in claim 1, including means for angularly adjusting the planes in which the saws are arranged.

5. A machine of the character defined in claim 1, wherein the means for rotating the saws includes means for rotating some saws in one direction and other saws in the opposite direction.

6. A machine of the character defined in claim 5, including pins extending radially inwardly about the saw assembly for engaging a fin section on at least one side of the slits to twist it.

7. A machine of the character defined in claim 1, including pins extending radially inwardly about the saw assembly for engaging a fin section on at least one side of the slits to twist it.

8. A machine of the character defined in claim 1, wherein said saw assembly includes a plurality of saw units spaced along the length of the assembly and each including at least one saw.

9. A machine of the character defined in claim 8, wherein each saw unit includes at least one pair of diametrically opposed saws.

10. A machine of the character defined in claim 8, including means for adjusting the rotative position of each saw unit about the axis of the tubing to be passed through the assembly.

11. A machine of the character of the machine defined in claim 8, wherein the means for passing the tubing through the assembly is disposed only at opposite ends thereof.

References Cited

UNITED STATES PATENTS

| | | | |
|---|---|---|---|
| Re. 13,043 | 11/1909 | Klein | 83—5 |
| 570,729 | 11/1896 | Graham | 83—5 |
| 1,573,454 | 2/1926 | Shutz | 83—5 |
| 1,967,262 | 7/1934 | Robinson et al. | 83—5 |
| 2,803,869 | 8/1957 | Brauchler | 83—5 |
| 3,112,558 | 12/1963 | Nihlen et al. | 29—157.3 |

FOREIGN PATENTS 137,062   12/1902   Germany.

CHARLES W. LANHAM, Primary Examiner

E. M. COMBS, Assistant Examiner

U.S. Cl. X.R.

29—202